United States Patent
Jiang et al.

(10) Patent No.: US 11,663,181 B2
(45) Date of Patent: May 30, 2023

(54) DATABASE REPLICATION USING HETEROGENOUS ENCODING

(71) Applicant: International Business Machines Corporation, Armonk, NY (US)

(72) Inventors: Peng Hui Jiang, Beijing (CN); Su Liu, Austin, TX (US); Jun Su, Beijing (CN); He Fang Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 17/398,152

(22) Filed: Aug. 10, 2021

(65) Prior Publication Data

US 2023/0051996 A1 Feb. 16, 2023

(51) Int. Cl.
*G06F 16/20* (2019.01)
*G06F 16/215* (2019.01)
*G06F 16/23* (2019.01)
*G06F 16/22* (2019.01)
*G06F 16/27* (2019.01)
*G06F 9/50* (2006.01)
*G06F 11/14* (2006.01)

(52) U.S. Cl.
CPC .......... *G06F 16/215* (2019.01); *G06F 9/5055* (2013.01); *G06F 11/1451* (2013.01); *G06F 16/2272* (2019.01); *G06F 16/2365* (2019.01); *G06F 16/2379* (2019.01); *G06F 16/27* (2019.01); *G06F 2201/80* (2013.01)

(58) Field of Classification Search
None
See application file for complete search history.

(56) References Cited

U.S. PATENT DOCUMENTS

| | | | |
|---|---|---|---|
| 8,386,841 B1 | 2/2013 | Renade | |
| 10,146,631 B1* | 12/2018 | Pradeep | G06F 16/2365 |
| 10,678,664 B1 | 6/2020 | Lazier et al. | |
| 2006/0184561 A1* | 8/2006 | Terada | G06F 16/214 |
| | | | 707/999.102 |
| 2020/0127684 A1 | 4/2020 | Park et al. | |
| 2022/0318211 A1* | 10/2022 | Ji | G06F 16/2282 |

FOREIGN PATENT DOCUMENTS

KR 101731832 B1 5/2017

OTHER PUBLICATIONS

Anonymous, "Azure Storage redundancy" URL: https://docs.microsoft.com/en-us/azure/storage/common/storage-redundancy; Dec. 28, 2022; 18 Pages.

* cited by examiner

*Primary Examiner* — Jau Shya Meng
(74) *Attorney, Agent, or Firm* — Cantor Colburn LLP; Teddi Maranzano

(57) ABSTRACT

A database replication using heterogenous encoding is provided. Aspects include obtaining a database and analyzing a data pattern of data in the database. Aspects also include identifying a plurality of candidate encoding formats and evaluating a computing cost for encoding the database for each of the plurality of candidate encoding formats. Aspects further include selecting an encoding format from the plurality of candidate encoding formats based at least in part on the computing cost and storing a backup copy of the database using the encoding format.

20 Claims, 6 Drawing Sheets

DATABASE REPLICATION USING HETEROGENOUS ENCODING

BACKGROUND

The present invention generally relates to database replication, and more specifically, to database replication using heterogenous encoding.

Most modern-day database systems employ database replication to ensure that critical databases provide redundancy to protect against the loss of data and to maintain the accessibility of the database. Database replication is the frequent copying of data from one database in one computer or server to another database in another computer or server. Database replication ensures that the failure of the computer or server will not result in the loss of the data stored in the database or a loss of accessibility of the database.

While database replication provides improved accessibility and redundancy, it does so at the cost of increased storage requirements as the storage capacity required to provide database replication is multiple times the storage capacity needed to store a single copy of a database.

SUMMARY

Embodiments of the present invention are directed to a computer-implemented method for database replication using heterogenous encoding. A non-limiting example of the computer-implemented method includes obtaining a database and analyzing a data pattern of data in the database. The method also includes identifying a plurality of candidate encoding formats and evaluating a computing cost for encoding the database for each of the plurality of candidate encoding formats. The method further includes selecting an encoding format from the plurality of candidate encoding formats based at least in part on the computing cost and storing a backup copy of the database using the encoding format.

Embodiments of the present invention are directed to a system for database replication using heterogenous encoding. A non-limiting example of the system includes a processor communicative coupled to a memory, the processor operable to obtain a database and analyze a data pattern of data in the database. The processor is also operable to identify a plurality of candidate encoding formats and evaluate a computing cost for encoding the database for each of the plurality of candidate encoding formats. The processor is further operable to select an encoding format from the plurality of candidate encoding formats based at least in part on the computing cost and store a backup copy of the database using the encoding format.

Embodiments of the invention are directed to a computer program product for database replication using heterogenous encoding, the computer program product comprising a computer readable storage medium having program instructions embodied therewith. The program instructions are executable by a processor to cause the processor to perform a method. A non-limiting example of the method includes obtaining a database and analyzing a data pattern of data in the database. The method also includes identifying a plurality of candidate encoding formats and evaluating a computing cost for encoding the database for each of the plurality of candidate encoding formats. The method further includes selecting an encoding format from the plurality of candidate encoding formats based at least in part on the computing cost and storing a backup copy of the database using the encoding format.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
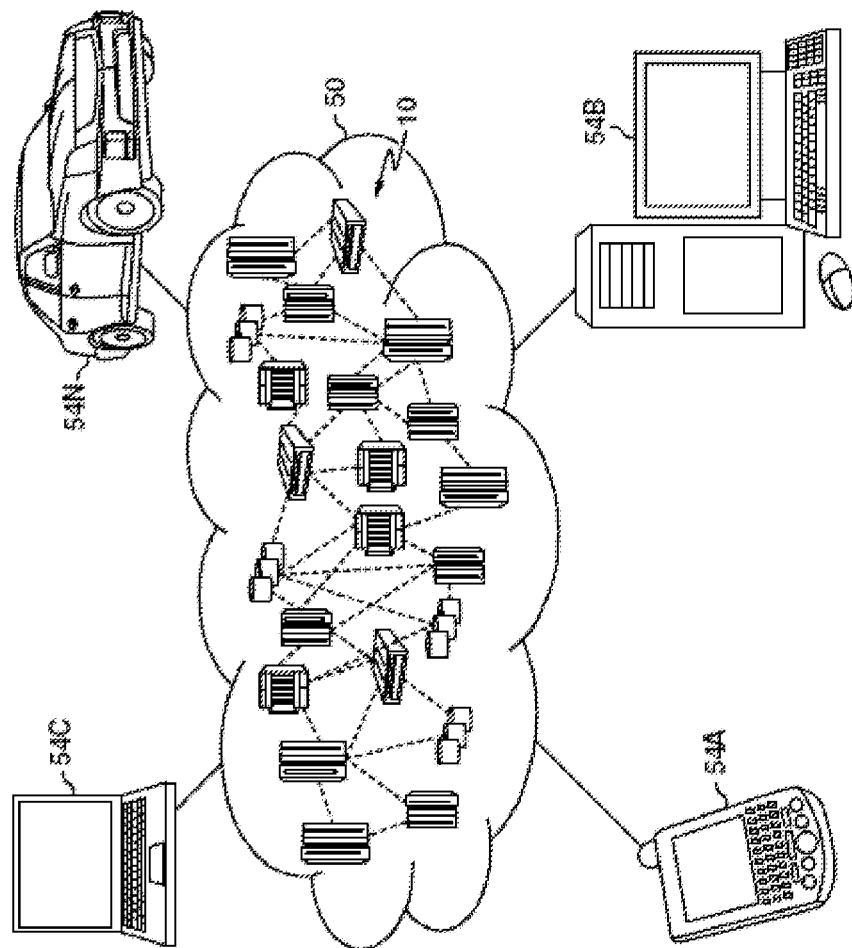
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, database replication is often used to provide redundancy to protect against the loss of data and to maintain the accessibility of the database. A typical database replication system utilizes multiple copies of a database to achieve redundancy and accessibility goals. However, most of the time, only one copy of the database is used to provide accessibility while other copies are used to provide redundancy. For redundant copies that are utilized to protect against the loss of data, it is not necessary to store the data in the same format as the primary database. Accordingly, systems, methods, and computer program products for database replication using heterogenous encoding are provided.

In exemplary embodiments, a database replication system is provided for a primary database which includes the use of multiple copies of the primary database. The copies of the primary database include a duplicate database and a backup database. In exemplary embodiments, the duplicate database is configured to ensure accessibility of the primary database and the backup database is configured to ensure redundancy of the primary database. In exemplary embodiments, the duplicate database and the backup database utilize different encoding formats.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
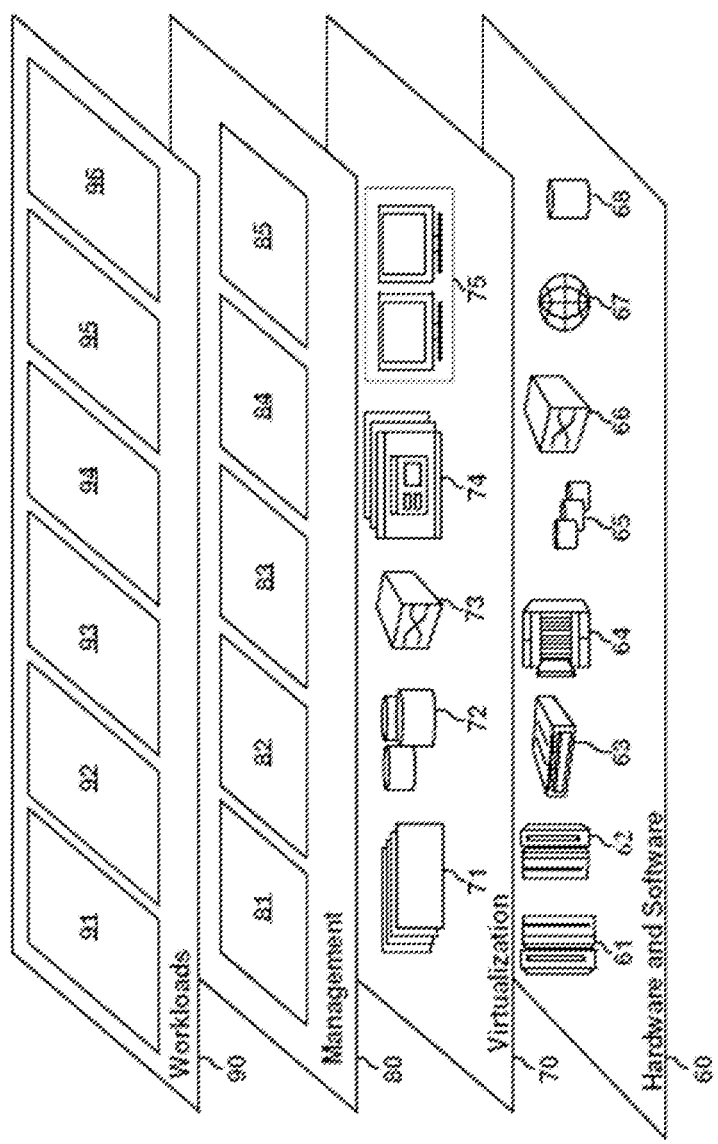
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database replication using heterogenous encoding 96.

Figure 3:
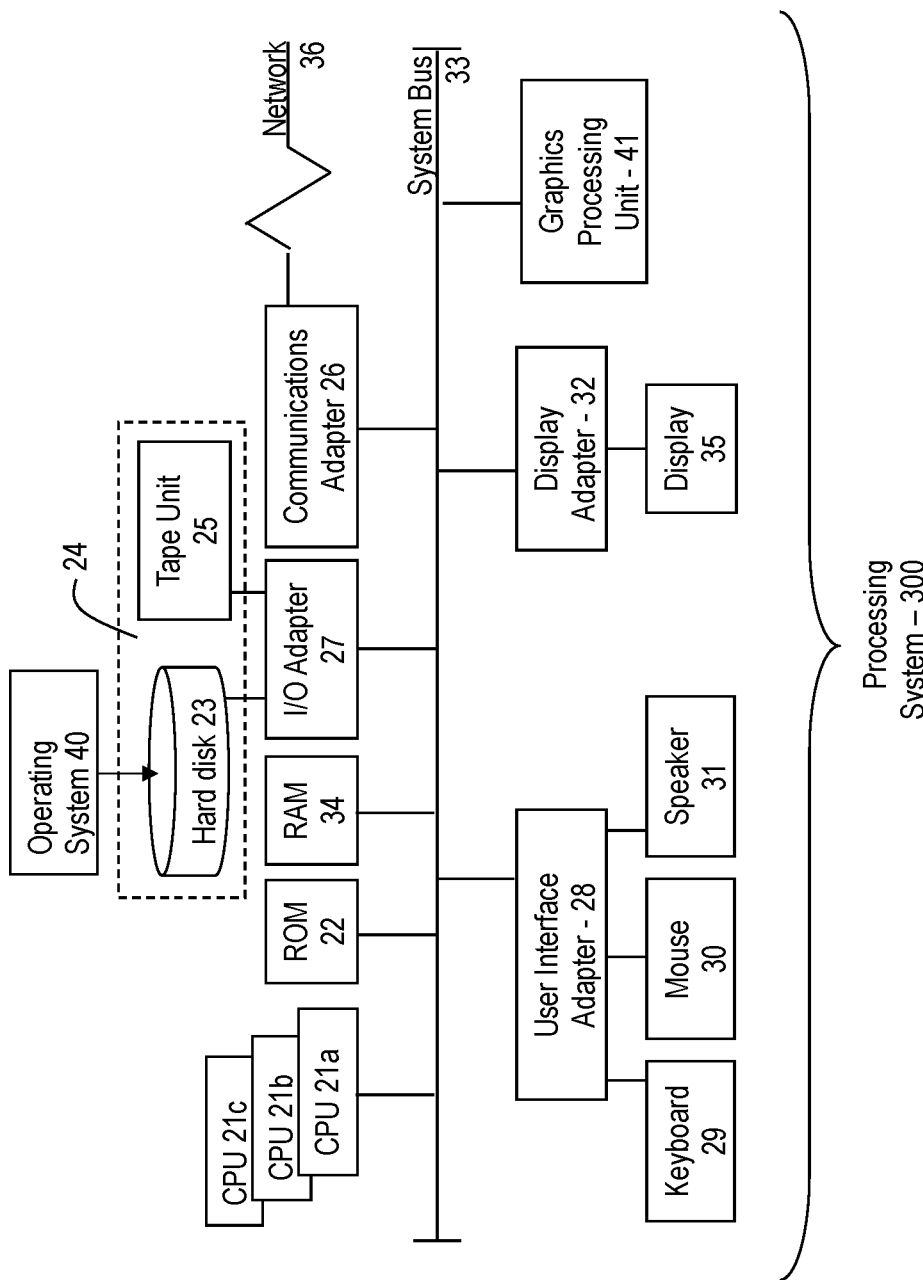
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 3.

Turning now to an overview of technologies that are more specifically relevant to aspects of the invention, methods, systems, and computer program products for database replication using heterogenous encoding are provided. In exemplary embodiments, the methods, systems, and computer program products for replication of a primary database are provided, which includes the use of a duplicate database and a backup database. In exemplary embodiments, the duplicate database is configured to ensure accessibility of the primary database and the backup database is configured to ensure redundancy of the primary database. In exemplary embodiments, the duplicate database and the backup database utilize different encoding formats.

Figure 4:
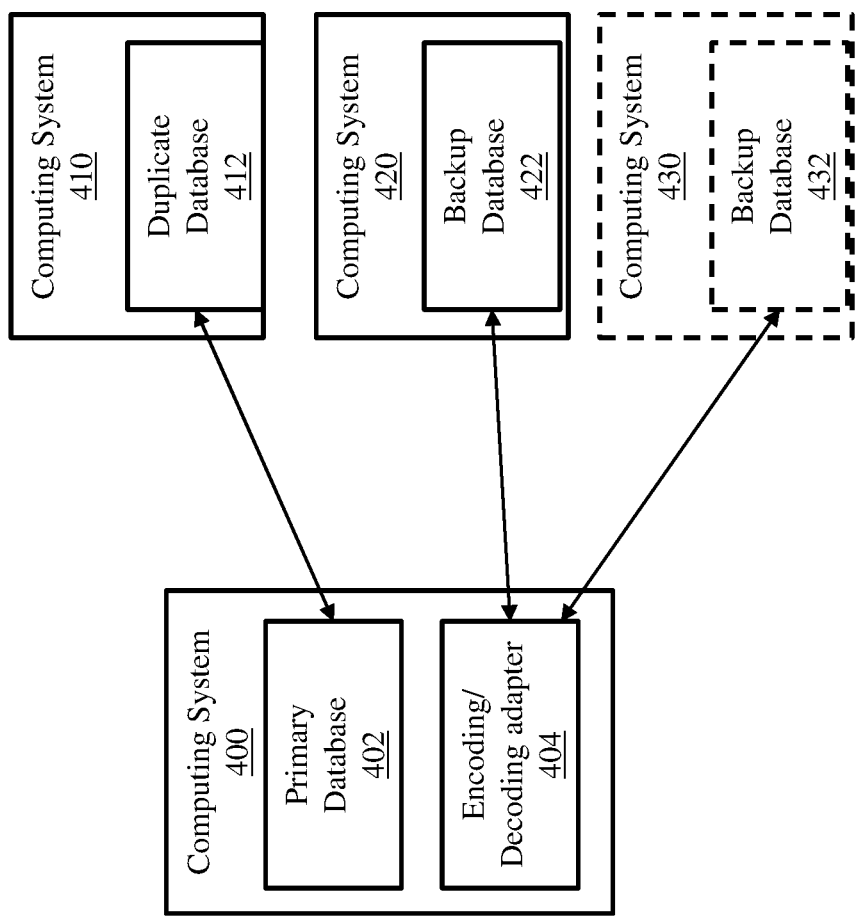
FIG. 4 depicts a system for database replication using heterogenous encoding according to embodiments of the invention.

Turning now to a more detailed description of aspects of the present invention, FIG. 4 depicts a system for database replication using heterogenous encoding according to embodiments of the invention. The system includes a computing system 400 that is configured to store a primary database 402, a computing system 410 that is configured to store a duplicate database 412, a computing system 420 that is configured to store a backup database 422, and optionally a computing system 430 that is configured to store another duplicate database 432.

One or more of the computing systems 400, 410, 420, 430 can be implemented on the processing system 300 found in FIG. 3. Additionally, the cloud computing system 50 can be in wired or wireless electronic communication with one or all of the elements of the computing systems 400, 410, 420, 430. Cloud 50 can supplement, support, or replace some or all of the functionality of the elements of the computing systems 400, 410, 420, 430. Additionally, some or all of the functionality of the elements of computing systems 400, 410, 420, 430 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In exemplary embodiments, a primary database 402 is maintained by the computing system 400, which utilizes a database replication system to ensure the availability and redundancy of the primary database 402. In exemplary embodiments, a computing system 410 is configured to store a duplicate database 412, which is a duplicate of the primary database 402. The duplicate database 412 is encoded using the same format as the primary database 402 and is configured to ensure that the accessibility of the data stored in the primary database 402. A computing system 420 is configured to store a backup database 422, which includes a backup of the data stored in the primary database 402 but which is stored in a format separate from the primary database. In exemplary embodiments, the backup database 422 is encoded using a different format as the primary database 402 and is configured to ensure to provide redundancy of the primary database 402. In exemplary embodiments, the backup database 422 is encoded to minimize the storage space required for storing the backup database 422.

In exemplary embodiments, the primary database 402 includes a plurality of chunks of data and an index. In one embodiment, a data pattern for each of the plurality of chunks of data and the index are analyzed and an encoding format for each of the plurality of chunks of data and the index is determined based on the data pattern. In exemplary embodiments, different chunks of data and the index of the primary database 402 are stored in different backup databases 422, 432 that are maintained by different computing systems 420, 430, respectively. The computing system 400 includes an encoding/decoding adaptor 404 that is configured to encode/decode data as it is transmitted between the primary database 402 and the backup database 422. In one embodiment, all of the portions of the primary database 402 that are encoded using one format are stored in the same backup database.

Figure 5:
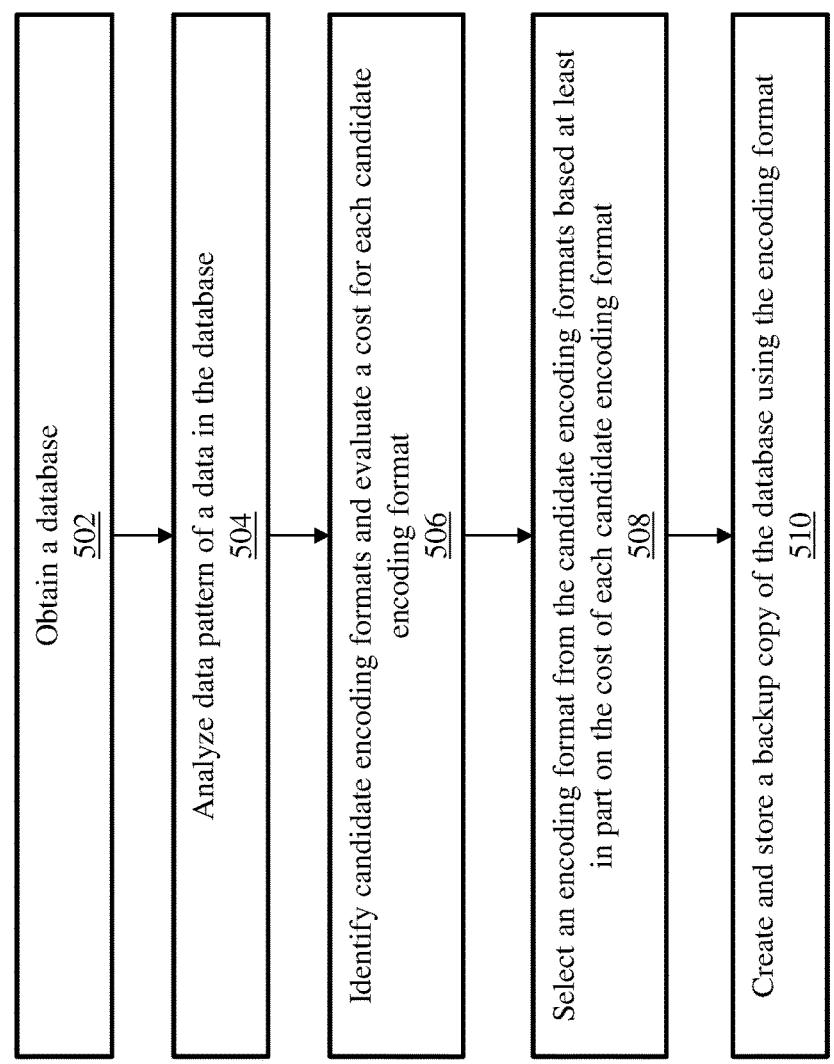
FIG. 5 depicts a flow diagram of a method for database replication using heterogenous encoding according to one or more embodiments of the invention.

FIG. 5 depicts a flow diagram of a method 500 for database replication using heterogenous encoding according to one or more embodiments of the invention. The method 500 includes obtaining a database. In exemplary embodiments, the database includes a plurality of data chunks and an index. Next, as shown at block 504, the method 500 includes analyzing a data pattern of data in the database. In one embodiment, the data pattern of data in the database includes analyzing the data pattern for each of the plurality of data chunks and the method includes analyzing a data pattern of the index. The method 500 also includes identifying a plurality of candidate encoding formats, as shown at block 506. In exemplary embodiments, the plurality of candidate encoding formats include ASCII, Unicode, 150-8859-1 and encoding for CJK characters, such as GB18030, EUC-JP, EUC-KR, and the like.

Next, as shown at block 508, the method 500 includes evaluating a computing cost for encoding the database for each of the plurality of candidate encoding formats. In one embodiment, the computing cost for each of the plurality of candidate encoding formats includes an expected computational cost for encoding the database using the candidate encoding format and an expected storage requirement reduction achieved by using the candidate encoding format. In another embodiment, the computing cost for each of the plurality of candidate encoding formats includes the conversion from original encoding format to target encoding format, such as from GB18030 to Unicode, and also the storage cost of storing data with Unicode format. The method 500 further includes selecting an encoding format from the plurality of candidate encoding formats based at least in part on the computing cost, as shown at block 508. In one embodiment, selecting the encoding format from the plurality of candidate encoding formats includes selecting encoding formats for each of the plurality of data chunks and the index. In one embodiment, the encoding format for at least two of the plurality of data chunks are different from one another. Next, the method 500 concludes at block 510 by creating and storing a backup copy of the database using the encoding format.

Figure 6:
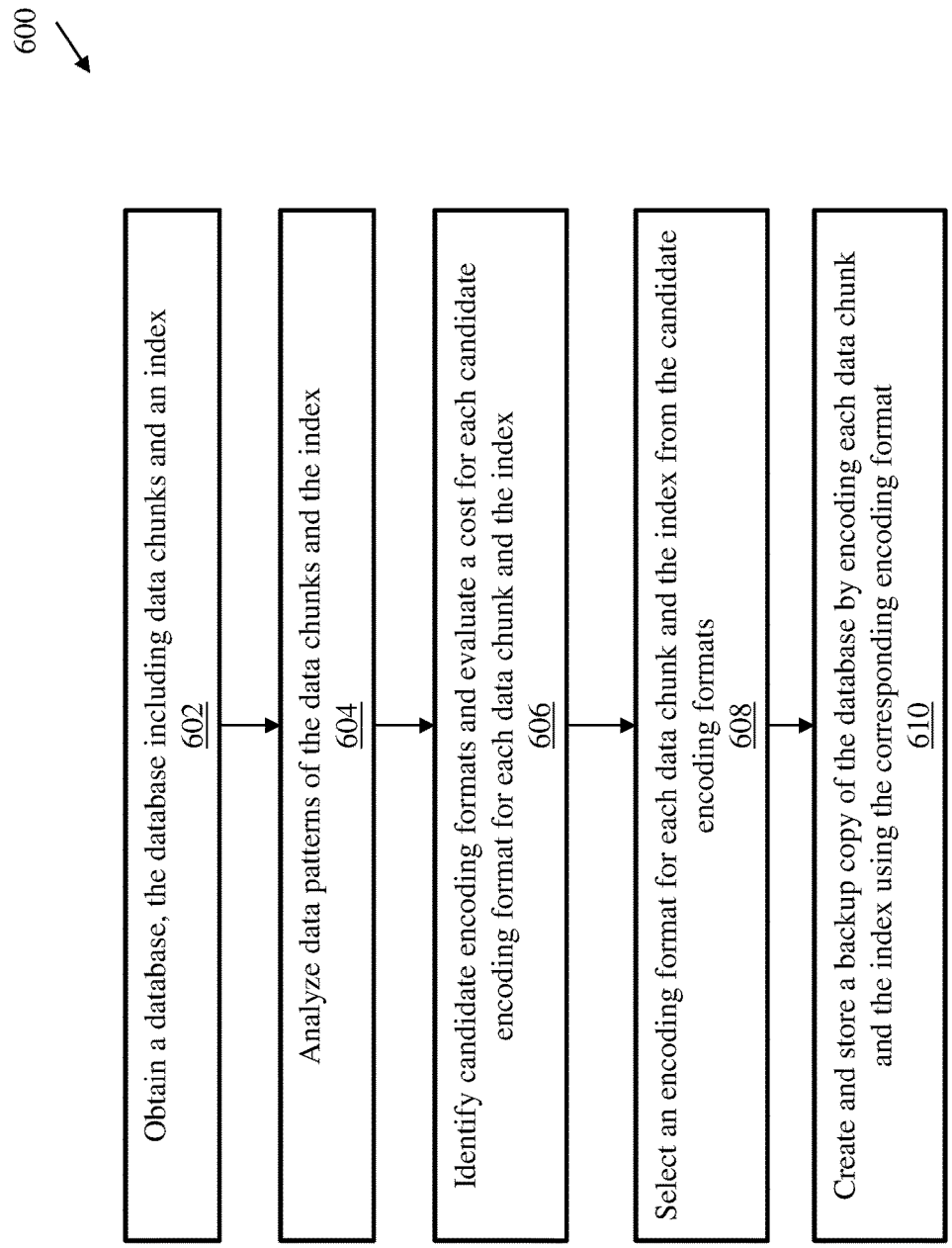
FIG. 6 depicts a flow diagram of another method for database replication using heterogenous encoding according to one or more embodiments of the invention.

FIG. 6 depicts a flow diagram of a method 600 for database replication using heterogenous encoding according to one or more embodiments of the invention. As shown at block 602, the method 600 includes obtaining a database, the database including data chunks and an index. Next, as shown at block 604, the method includes analyzing data patterns of the data chunks and the index. The method 600 also includes identifying candidate encoding formats and evaluate a cost for each candidate encoding format for each data chunk and the index, as shown at block 606. Next, as shown at block 608, the method includes selecting an encoding format for each data chunk and the index from the candidate encoding formats. The method 600 concludes at block 610 by creating and storing a backup copy of the database by encoding each data chunk and the index using the corresponding encoding format. In one embodiment, the method also includes identifying a change to one of the plurality of data chunks of the database, encoding, using the encoding format, the one of the plurality of data chunks of the database and updating the backup copy of the database by storing the encoded one of the plurality of data chunks of the database.

Technical benefits of database replication using heterogenous encoding include providing a database having redundancy that reduces the storage space required for redundant copies. Additional processes may also be included. It should be understood that the processes depicted in FIGS. 5 and 6 represent illustrations and that other processes may be added, or existing processes may be removed, modified, or rearranged without departing from the scope and spirit of the present disclosure.

In exemplary embodiments, a selected encoding format for data can change when re-evaluating the cost of the candidate encoding formats. When it is determined that the previously selected encoding format is no longer the desired encoding format, a background process is launched to perform conversion of data in database to the newly selected encoding format.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for database replication using heterogenous encoding, the method comprising:
    obtaining a database;
    analyzing a data pattern of data in the database;
    identifying a plurality of candidate encoding formats;
    evaluating a computing cost for encoding the database for each of the plurality of candidate encoding formats;
    selecting an encoding format from the plurality of candidate encoding formats based at least in part on the computing cost; and
    storing a backup copy of the database using the encoding format.

2. The method of claim 1, wherein the database includes a plurality of data chunks and an index.

3. The method of claim 2, further comprising:
    identifying a change to one of the plurality of data chunks of the database;
    encoding, using the encoding format, the one of the plurality of data chunks of the database; and
    updating the backup copy of the database by storing the encoded one of the plurality of data chunks of the database.

4. The method of claim 2, wherein analyzing the data pattern of data in the database includes analyzing the data pattern for each of the plurality of data chunks and wherein the method further comprises analyzing a data pattern of the index.

5. The method of claim 4, wherein selecting the encoding format from the plurality of candidate encoding formats includes selecting encoding formats for each of the plurality of data chunks and the index.

6. The method of claim 5, wherein the encoding format for at least two of the plurality of data chunks are different from one another.

7. The method of claim 1, wherein the computing cost for each of the plurality of candidate encoding formats includes an expected computational cost for encoding the database using the candidate encoding format and an expected storage requirement reduction achieved by using the candidate encoding format.

8. A system for database replication using heterogenous encoding; the system comprising:
    A processor communicatively coupled to a memory, the memory stores instructions, the instructions are executed by the processor to cause the processor to:
        obtain a database;
        analyze a data pattern of data in the database;
        identify a plurality of candidate encoding formats;
        evaluate a computing cost for encoding the database for each of the plurality of candidate encoding formats;
        select an encoding format from the plurality of candidate encoding formats based at least in part on the computing cost; and
        store a backup copy of the database using the encoding format.

9. The system of claim 8, wherein the database includes a plurality of data chunks and an index.

10. The system of claim 9, wherein the processor is further configured to:
    identify a change to one of the plurality of data chunks of the database;
    encode, using the encoding format, the one of the plurality of data chunks of the database; and
    update the backup copy of the database by storing the encoded one of the plurality of data chunks of the database.

11. The system of claim 9, wherein analyzing the data pattern of data in the database includes analyzing the data pattern for each of the plurality of data chunks and wherein the method further comprises analyzing a data pattern of the index.

12. The system of claim 11, wherein selecting the encoding format from the plurality of candidate encoding formats includes selecting encoding formats for each of the plurality of data chunks and the index.

13. The system of claim 12, wherein the encoding format for at least two of the plurality of data chunks are different from one another.

14. The system of claim 8, wherein the computing cost for each of the plurality of candidate encoding formats includes an expected computational cost for encoding the database using the candidate encoding format and an expected storage requirement reduction achieved by using the candidate encoding format.

15. A computer program product for database replication using heterogenous encoding comprising a computer readable storage medium having program instructions embodied therewith, the program instructions executable by a processor to cause the processor to perform a method comprising:
    obtaining a database;
    analyzing a data pattern of data in the database;
    identifying a plurality of candidate encoding formats;
    evaluating a computing cost for encoding the database for each of the plurality of candidate encoding formats;
    selecting an encoding format from the plurality of candidate encoding formats based at least in part on the computing cost; and
    storing a backup copy of the database using the encoding format.

16. The computer program product of claim 15, wherein the database includes a plurality of data chunks and an index.

17. The computer program product of claim 16, wherein the method further comprises:
    identifying a change to one of the plurality of data chunks of the database;
    encoding, using the encoding format, the one of the plurality of data chunks of the database; and
    updating the backup copy of the database by storing the encoded one of the plurality of data chunks of the database.

18. The computer program product of claim 16, wherein analyzing the data pattern of data in the database includes analyzing the data pattern for each of the plurality of data chunks and wherein the method further comprises analyzing a data pattern of the index.

19. The computer program product of claim 18, wherein selecting the encoding format from the plurality of candidate encoding formats includes selecting encoding formats for each of the plurality of data chunks and the index.

20. The computer program product of claim 19, wherein the encoding format for at least two of the plurality of data chunks are different from one another.

* * * * *